United States Patent
Mathew et al.

(10) Patent No.: US 12,459,405 B2
(45) Date of Patent: Nov. 4, 2025

(54) UNDERFRAME FOR A HEIGHT ADJUSTER, AND HEIGHT ADJUSTER

(71) Applicant: Adient US LLC, Plymouth, MI (US)

(72) Inventors: Lijo Mathew, Pune (IN); Dnyaneshwar Garad, Pune (IN); Vijay Unde, Pune (IN); Igor Gordeenko, Frechen (DE); Tobias Ewald, Hueckeswagen (DE); Juraj Bagin, Dubnica nad Váhom (SK)

(73) Assignee: Adient US LLC, Plymouth, MI (US)

( * ) Notice: Subject to any disclaimer, the term of this patent is extended or adjusted under 35 U.S.C. 154(b) by 281 days.

(21) Appl. No.: 18/454,116

(22) Filed: Aug. 23, 2023

(65) Prior Publication Data

US 2024/0067058 A1 Feb. 29, 2024

(30) Foreign Application Priority Data

Aug. 30, 2022 (DE) ...................... 10 2022 208 994.4

(51) Int. Cl.
*B60N 2/16* (2006.01)
*B60N 2/12* (2006.01)

(52) U.S. Cl.
CPC .............. *B60N 2/164* (2013.01); *B60N 2/12* (2013.01)

(58) Field of Classification Search
CPC .............................. B60N 2/164; B60N 2/2245
See application file for complete search history.

(56) References Cited

U.S. PATENT DOCUMENTS

| | | | | |
|---|---|---|---|---|
| 6,109,693 A * | 8/2000 | Bauer | ................... | B60N 2/1615 297/284.3 |
| 8,328,154 B2 * | 12/2012 | Beneker | ............... | B60N 2/1615 248/419 |
| 2007/0170769 A1 * | 7/2007 | Beneker | ................... | B60R 22/26 297/468 |
| 2008/0179932 A1 * | 7/2008 | Becker | ............... | B60N 2/02246 297/367 R |
| 2010/0213341 A1 * | 8/2010 | Beneker | ................... | B60N 2/233 248/419 |
| 2010/0237216 A1 * | 9/2010 | Napau | ....................... | F16H 1/32 297/344.17 |
| 2011/0163585 A1 * | 7/2011 | Beneker | ............. | B60N 2/02246 297/344.15 |
| 2013/0257126 A1 * | 10/2013 | Freisleben | ........... | B60N 2/0284 29/428 |

(Continued)

FOREIGN PATENT DOCUMENTS

| | | |
|---|---|---|
| DE | 10029669 A1 | 1/2001 |
| DE | 10107695 A1 | 9/2002 |

(Continued)

*Primary Examiner* — Shin H Kim
(74) *Attorney, Agent, or Firm* — Marshall & Melhorn, LLC (57) ABSTRACT

An underframe for a height adjuster of a seat, in particular a vehicle seat, may have a base frame which is connectable to a vehicle floor, a seat frame which is adjustable relative to the base frame and has at least one frame part, and a spindle drive unit for adjusting the seat frame relative to the base frame. The spindle drive unit has a first bearing point, which is connected pivotably to the frame part, and a second bearing point, which is connected pivotably to the base frame. A height adjuster for the vehicle seat is also provided.

12 Claims, 7 Drawing Sheets

(56) References Cited

U.S. PATENT DOCUMENTS

| | | | |
|---|---|---|---|
| 2013/0284874 A1* | 10/2013 | Domgorgen | B60N 2/161 248/419 |
| 2018/0001793 A1* | 1/2018 | Pleskot | B60N 2/1695 |
| 2019/0143851 A1* | 5/2019 | Handigol | B60N 2/20 297/341 |
| 2019/0152352 A1* | 5/2019 | Handigol | B60N 2/12 |
| 2020/0231068 A1* | 7/2020 | Gropp | B60N 2/07 |
| 2023/0286420 A1* | 9/2023 | Hofmann | B60N 2/1615 |
| 2024/0067058 A1* | 2/2024 | Mathew | B60N 2/1615 |
| 2024/0140275 A1* | 5/2024 | Schukalski | B60N 2/1615 |
| 2024/0262264 A1* | 8/2024 | Cieslak | B60N 2/1814 |

FOREIGN PATENT DOCUMENTS

| | | |
|---|---|---|
| DE | 102016219683 A1 | 2/2018 |
| DE | 102020112388 A1 | 11/2021 |
| DE | 102020208832 A1 | 1/2022 |
| DE | 102020122388 A1 | 3/2022 |
| WO | 2021083817 A1 | 5/2021 |

* cited by examiner

UNDERFRAME FOR A HEIGHT ADJUSTER, AND HEIGHT ADJUSTER

FIELD

The invention relates to an underframe for a height adjuster of a seat, in particular vehicle seat, and to a height adjuster for a seat, in particular a vehicle seat.

BACKGROUND

Underframes for motor vehicle seats exist by now in diverse configurations, the underframes, depending on their configuration, permitting a multiplicity of adjustment options of the motor vehicle seat in order thus to permit the user to optimally adapt the sitting position. The adjustment options are achieved here by structural units, which are adjustable relative to one another, of the motor vehicle seat or of the underframe thereof, with the structural units being able to be displaced with respect to one another both in a motorized and in a manual manner.

Due to the multiplicity of adjustment options, the underframes are frequently highly complex, as a result of which, however, a high outlay on material and high production costs for such motor vehicle seats arise. However, manufacturers increasingly also require cost-effective, lightweight and simple vehicle seats which are intended to make it possible for the vehicle manufacturers to provide particularly inexpensive vehicles, in which, although comfort losses in respect of the adjustability of the motor vehicle seat are accepted, basic adjustment options, such as, for example, adapting the length of the motor vehicle seat to the respective user, are intended to be conveniently ensured. This refers both to the adjustable sitting positions and operability.

SUMMARY

The invention is based on the problem of improving an underframe of the type mentioned at the beginning, in particular designing it with a reduced number of parts, and so as to be robust and compact, and of providing a corresponding height adjuster.

This problem is solved according to the invention by an underframe for a height adjuster of a seat, in particular a vehicle seat, having at least a base frame which is connectable to a vehicle floor, a seat frame which is adjustable relative to the base frame and has at least one frame part, and a spindle drive unit for adjusting the seat frame relative to the base frame, wherein the spindle drive unit has a first bearing point, which is connected pivotably to the frame part, and a second bearing point, which is connected pivotably to the base frame.

Owing to the fact that the spindle drive unit has a first bearing point, which is connected pivotably to the frame part, and a second bearing point, which is connected pivotably to the base frame, the spindle drive unit can be supported in a simple manner at only two bearing points or rotation points. This provides an underframe with a reduced number of parts and which is robust and compact for a height adjuster.

The underframe according to the invention comprises fewer components than the prior art, as a result of which costs, processing time and complexity are reduced.

Advantageous refinements which can be used individually or in combination with one another are the subject matter of the dependent claims.

A characteristic feature of the underframe according to the invention is that the spindle drive unit can be arranged completely on and/or along a side surface of the frame part of the seat frame. In other words: components of the spindle unit, such as for example a spindle, a transmission unit, a motor and a holder, are arranged on the same side of the frame part. The underframe can thereby be designed in a manner saving on construction space. For example, the spindle drive unit can be arranged on an outer side surface of the frame part. For example, the seat frame can comprise at least two lateral frame parts. A front frame part which connects the two lateral frame parts can additionally be provided.

The spindle drive unit can be arranged completely on one of the lateral frame parts. Owing to the fact that the spindle drive unit, at least having a transmission unit, a spindle which is drivable by the transmission unit, and a motor for driving the transmission unit, is arranged on the outer side surface, i.e. on the side surface of the frame part that is directed into a vehicle space, a space which is formed between the lateral frame parts can be used for further seat components, for example supporting structures and/or suspension structures.

Pivot axes of the bearing points can be arranged spaced apart from one another and can run parallel to one another. The spindle drive unit can be mounted rotatably about the pivot axes relative to the seat frame and to the base frame. This permits a simple height adjustment of the seat, with ergonomic requirements of a person sitting on the seat being able to be met.

The spindle drive unit can comprise at least one spindle, wherein a spindle axis of the spindle is arranged oriented, for example perpendicularly, in a corresponding manner to pivot axes defined by the bearing points. The spindle can define an adjustment direction. A transmission unit of the spindle drive unit can be moved along the spindle axis, with pivoting of the spindle drive unit about the respective pivot axis of the bearing points being brought about. An adjustment, in particular height adjustment, of the seat frame, enabling a sitting position of the user to be determined, results from shifting the seat frame in relation to the base frame. Via, for example, a connection of the seat frame to the base frame by way of a front and rear pair of rockers, there is the possibility of adjusting the seat frame between a rearmost position and a frontmost position relative to the base frame, which permits a longitudinal positioning of the seat frame with a simultaneous change in height. Although the base frame can basically be connected displacably to the vehicle floor, for example via a longitudinal adjuster, in the case of the underframe according to the invention the base frame can also be designed in such a manner that it can be connected rigidly to the vehicle floor. The seat frame can therefore be readily adapted to the position desired by the user without an additional longitudinal adjustment being required for this purpose.

The spindle drive unit can comprise at least one transmission unit for driving the spindle and a holder for receiving the transmission unit.

The at least one spindle drive unit can be arranged in the region of the rear and/or front pair of rockers. The spindle drive unit can be arranged on the frame part on a side opposite a rocker of the pair of rockers. Owing to the fact that the spindle drive unit is arranged in the region of a pair of rockers, an adjustment movement of the seat frame relative to the base frame can be initiated very substantially rapidly and simply. In addition, a very substantially precise adjustment position can be set. Furthermore, the arrangement of the spindle drive unit close to the pair of rockers saves on construction space.

The holder can form the first bearing point and one end of the spindle can form the second bearing point, wherein the bearing points each comprise a bearing element in the form of a bolt. For example, the first bearing point can comprise a bearing element which is in the form of a stepped bolt and which is mounted pivotably in a bearing opening of the frame part. A protruding end of the stepped bolt can be fastened to the frame part by a nut. The protruding end of the stepped bolt can have a thread.

The end of the spindle can be fastened to the base frame via the bearing element. The bearing element of the second bearing point can be a stepped bolt. The bearing element can be a pin, a journal or a press-fit bolt or a rivet bolt.

The holder can comprise at least one first holding side connected to the frame part and a second holding side protruding perpendicularly with respect to the first holding side, wherein the transmission unit is fastened to the second holding side. The first holding side can have the bearing element. For example, the bearing element can protrude perpendicularly from the holding side and can be inserted at least in sections into a bearing opening in the frame part. The transmission unit can be connected to the holding side in an integrally bonded, force-fitting and/or form-fitting manner. When the holder is pivoted relative to the frame part, the transmission unit and therefore the spindle which is guided by the transmission unit can be pivoted at the same time. The first holding side can be designed as a web and the second holding side as a limb protruding from the web.

The holder can be U-shaped or C-shaped, with the transmission unit being accommodated between two limbs of the holder. For example, the transmission unit can be arranged at least in a form-fitting manner between the limbs. The transmission unit can be connected, for example, to the holder in a force-fitting and/or integrally bonded manner.

The spindle drive unit can comprise a motor which is coupled to the transmission unit and extends parallel to the side surface of the frame part. Construction space can thereby be saved.

The transmission unit can drive the spindle perpendicularly to the transmission axis of the transmission unit.

The underframe can have a spring element for pretensioning the seat frame into a starting position. The spring element can be formed by a torsion bar spring clamped in a manner substantially free from play.

The problem is also solved according to the invention by a height adjustor for a seat, in particular a vehicle seat, having an underframe and a rocker arrangement, wherein the underframe comprises at least one base frame which is connectable to a vehicle floor, a seat frame which is adjustable relative to the base frame and has at least one frame part, and a spindle drive unit for adjusting the seat frame relative to the base frame, wherein the spindle drive unit has a first bearing point, which is connected pivotably to the frame part, and a second bearing point, which is connected pivotably to the base frame, and wherein the rocker arrangement comprises two pairs of rockers which are connected to the seat frame and to the base frame. In particular, the spindle drive unit is arranged in the region of one of the pairs of rockers.

The respective pair of rockers, in particular rockers of the respective pair of rockers, can be configured in such a manner that the height position produced upon shifting of the seat frame via the rockers corresponds to the users' requirements which generally exist for the respective longitudinal position. It is not absolutely necessary here for the frontmost position to inevitably correspond to the highest position. The frontmost position can thus be arranged even after a high point defined by a pivotability of the rockers is exceeded.

The pairs of rockers can each be connected in an articulated manner at one end to the seat frame and at another end to the base frame and/or to a longitudinal adjuster and/or vehicle floor arranged below the base frame.

The spindle drive unit which is drivable in a motorized manner via a suitable mechanism makes it possible to shift the seat frame in relation to the base frame, wherein the position which is set can be determined, for example, on the basis of self-locking or by locking means which can optionally be provided.

The spindle drive unit can be arranged completely on one of the lateral frame parts. Owing to the fact that the spindle drive unit, at least having a transmission unit, a spindle which is drivable by the transmission unit, and a motor for driving the transmission unit, is arranged on the outer side surface, i.e. on the side surface of the frame part directed into a vehicle space, a space formed between the lateral frame parts can be used for further seat components, for example supporting structures and/or suspension structures.

Pivot axes of the bearing points can be arranged spaced apart from one another and can run parallel to one another. The spindle drive unit can be mounted rotatably about the pivot axes relative to the seat frame and to the base frame. This permits a simple height adjustment of the seat, with ergonomic requirements of a person sitting on the seat being able to be met.

The spindle drive unit can comprise at least one spindle, wherein a spindle axis of the spindle is arranged perpendicularly to pivot axes defined by the bearing points. To assist the adjustment movement, use can be made of a torsion bar spring which is clamped in a manner substantially free from play and pretensions the seat frame in the direction of a starting position. The starting position is a position of the seat frame between the rearmost position and the frontmost position, the position being determined within the context of the installation of the underframe and basically being as desired, with the rearmost and the frontmost position themselves also being able to form the starting position. The pretensioning achieved by the torsion bar spring, with a spring element being able to be installed in a manner substantially free from play, i.e. with the customary tolerances or with deviations going slightly beyond them, ensures convenient shifting of an adjustable seat frame in the direction of the starting position since the spring element assists the adjustment movement of the seat frame.

Proceeding from the starting position, it is possible for the user in a particularly simple manner to adjust the seat position suitable for them, wherein, in particular in the event of an arrangement which can be provided of the starting position differing from the rearmost position, convenient operation can be achieved since then, within the context of an adjustment from a rearmost position in the direction of the frontmost position or vice versa, the upward movement of the seat frame associated with the pivoting movement of the rockers is assisted.

The height adjuster according to the invention is therefore distinguished in particular in that it can be produced particularly simply and cost-effectively owing to the particularly small number of structural elements, but at the same time permits a convenient height adjustment in conjunction with a longitudinal adjustment of the seat frame and therefore adaptation to the ergonomic requirements of the respective users.

The use of a geared motor enables the seat frame to be adjusted particularly precisely in relation to the base frame, thus resulting in an exact determination of the desired sitting position.

A coupling point of the spindle drive unit is basically freely selectable. According to one refinement of the invention, the spindle drive unit can be arranged in the region of a rear rocker. This refinement of the invention, according to which the coupling point of the spindle drive unit is arranged close to a coupling point of the rear rocker of the rear pair of rockers to the base frame, permits a particularly well graduated adjustment of the seat frame, thus making it easier for the user to set a sitting position which is comfortable for them.

The base frame can basically be designed as desired, the base frame being able to be formed, for example, in the form of a plate, a holding element and/or a holding block. The base frame can be fixed to a vehicle floor and/or to a longitudinal adjuster.

Like the base frame, the seat frame can thus basically also be configured as desired. According to one refinement of the invention, the seat frame can have two frame parts which are arranged at a distance from each other, in particular seat frame side parts, which are connected to each other by at least one further frame part, in particular a seat frame crosspiece. This refinement of the seat frame makes it possible to design the latter to be a particularly simple and cost-effective and also lightweight. The stability which is required for the seat frame, in particular also crash stability, is ensured here by the at least one seat frame crossbar which determines the position of the seat frame side parts in relation to one another.

The articulated connection of the front and/or rear rockers to the base frame, vehicle floor or longitudinal adjuster and to the seat frame can be undertaken basically as desired depending on the available construction spaces and the required adjustability.

The arrangement of the torsion bar spring for determining the starting position, into which the seat frame can be pretensioned because of the torsion bar spring, takes place, for example, in such a manner that the torsion bar spring can be fixed at one end to a seat frame side part and at another end to a seat frame crossbar. This arrangement permits a simple and space-saving arrangement of the torsion bar spring, as a result of which the starting position of the seat frame in relation to the base frame can be reliably determined.

In summary and in other words, the invention provides an underframe and a height adjuster, in which fewer components are located in the interior of the seat frame, with it being possible for the spindle drive unit to be accommodated completely outside the seat frame. This type of arrangement can be suitable in an improved manner, for example, for low block heights in order to create more space for the installation of further seat structure components.

DESCRIPTION OF THE FIGURES

The invention is explained in more detail below with reference to advantageous exemplary embodiments which are illustrated in the figures. However, the invention is not restricted to these exemplary embodiments. In the figures.

DETAILED DESCRIPTION

Mutually corresponding parts are provided with the same reference signs in all of the figures.

Figure 1:
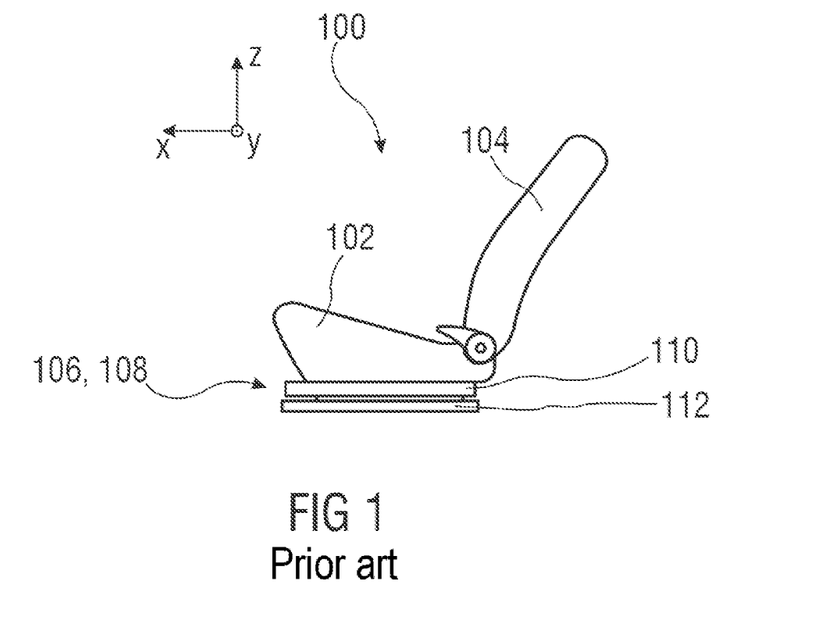
FIG. 1: shows a side view of a vehicle seat from the prior art.

A vehicle seat 100 which is illustrated schematically in FIG. 1 for the prior art is described below using three directions in space running perpendicularly to one another. When a vehicle seat 100 is installed in the vehicle, a longitudinal direction x runs substantially horizontally and preferably parallel to a longitudinal direction of the vehicle which corresponds to the conventional direction of travel of the vehicle. A transverse direction y running perpendicularly to the longitudinal direction x is likewise oriented horizontally in the vehicle and runs parallel to a transverse direction of the vehicle. A vertical direction z runs perpendicularly to the longitudinal direction x and perpendicularly to the transverse direction y. When a vehicle seat 100 is installed in the vehicle, the vertical direction z runs parallel to the vertical axis of the vehicle.

The position details and direction details used, such as for example front, rear, top, bottom and transversely, relate to a viewing direction of an occupant sitting in a customary sitting position on a seat part 102 of the vehicle seat 100, wherein the vehicle seat 100 is installed in the vehicle in a use position suitable for conveying people and with an upright backrest 104, and is oriented as customary in the direction of travel. However, the vehicle seat 100 can also be installed in a different orientation, for example transversely with respect to the direction of travel. Unless described differently, the vehicle seat 100 is constructed mirror-symmetrically with respect to a plane running perpendicularly to the transverse direction y.

The vehicle seat 100 furthermore comprises a longitudinal adjuster with a left and right pair of rails 106, 108. The respective pair of rails 106, 108 comprises a floor rail 112, which is fastenable to a vehicle structure, for example to a vehicle floor, and an, in particular longitudinally adjustable, seat rail 110, which is adjustable relative to the floor rail 112. The seat rail 110 is connected, for example, to the seat part 102.

Figure 2:
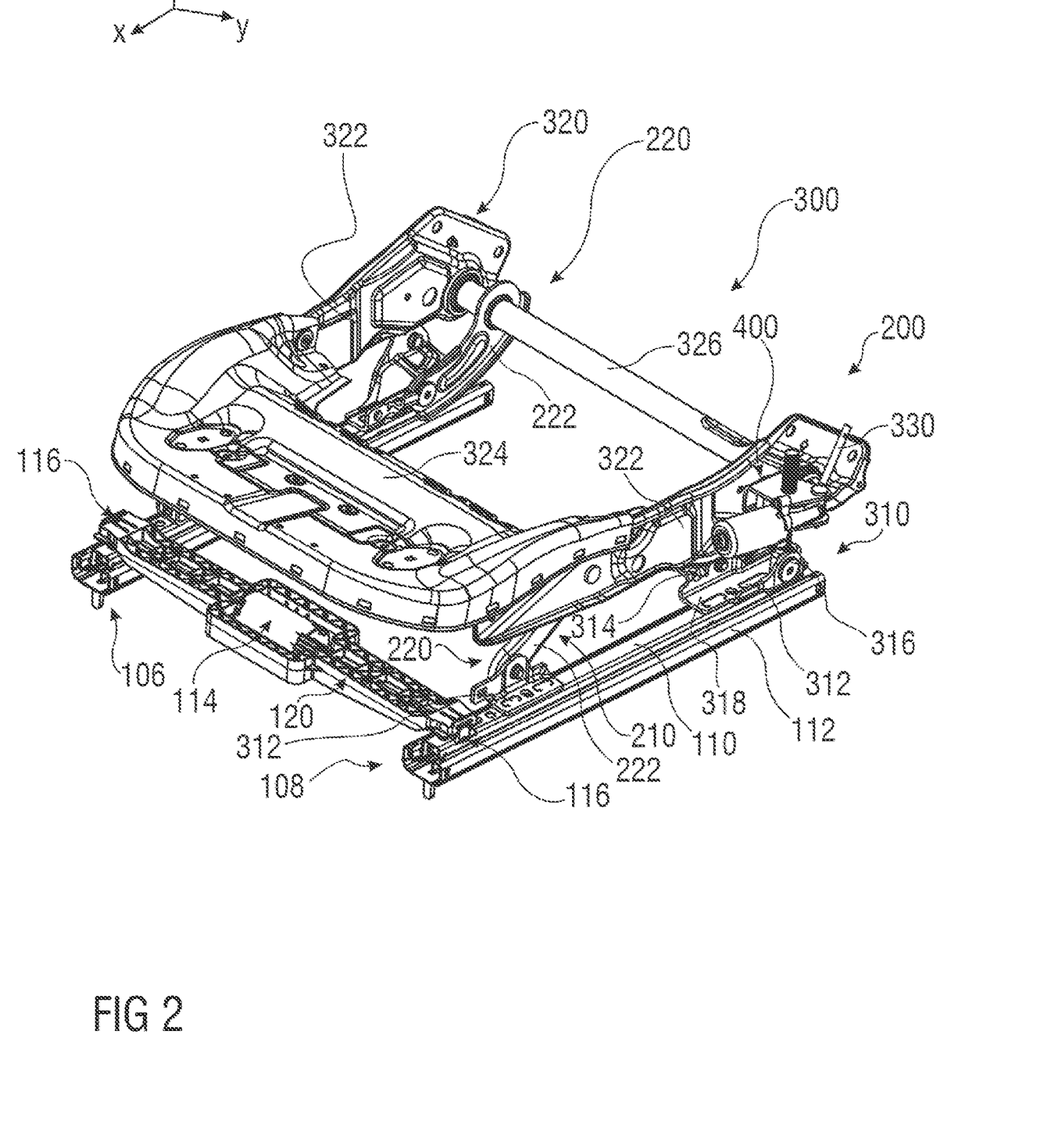
FIG. 2: shows a perspective view of a height adjuster according to the invention for a vehicle seat having an underframe and a spindle drive unit.

FIG. 2 shows a perspective view of a height adjuster 200 according to the invention for a vehicle seat 100, wherein the height adjuster 200 comprises a rocker arrangement 210 and an underframe 300 having a spindle drive unit 400. The rocker arrangement 210 comprises two pairs of rockers 220.

FIG. 2 shows two pairs of rails 106, 108. The longitudinal adjuster also comprises an electric motor 114 which is arranged between said two pairs of rails 106, 108 and extends substantially in the transverse direction y. In the present case, the adjustment direction corresponds to the longitudinal direction x, but the adjustment direction may also be oriented at any angle with respect to the longitudinal direction x. An adjustment transmission 116 is accommodated in each pair of rails 106, 108. The adjustment transmission 116 is in each case accommodated within a channel which extends in the longitudinal direction x and is delimited by the pairs of rails 106, 108 and is open on the end side. The adjustment transmission 116 has in each case a rotationally fixed spindle and a spindle nut which is in engagement therewith, wherein the spindle nut is indirectly drivable by the electric motor 114.

A motor carrier 120 which extends substantially in the transverse direction y is arranged between the two pairs of rails 106, 108, in particular between the two seat rails 110. The motor carrier 120 is in each case fastened to the seat rail 110 and/or to the adjustment transmission 116.

The underframe 300 comprises a base frame 310 and a seat frame 320 which is adjustable relative to the base frame 310.

In the exemplary embodiment which is shown, the base frame 310 comprises two base elements 312 per pair of rails 106, 108. Alternatively, the base frame 310 can comprise a single-part base element 312. The base elements 312 can be L-shaped or U-shaped. The base elements 312 form base-holding elements for connecting the rocker arrangement 210 to the respective pair of rails 106, 108. Alternatively, the base frame 310 can be fastened to the vehicle floor. The base frame 310 can be designed in the form of a base plate.

The base elements 312 are each fastened to the respective seat rail 110. For example, the base elements 312 are screwed to the seat rail 110. The base elements 312 can be connected to the respective seat rail 110 in a force-fitting, integrally bonded and/or form-fitting manner.

The rear base element 312 on which one of the rear rockers 222 and the spindle drive unit 400 are rotatably mounted is substantially U-shaped. The rear base element 312 comprises two base sides 314, 316 which are opposite each other in parallel, and a base web 318 connecting the base sides 314, 316.

The rear rocker 222 is mounted rotatably on an inner base side 314. For example, the rear rocker 222 can be mounted rotatably on the inner base side 314 via a bearing element 230, which is illustrated in more detail in FIG. 3, for example in the form of a bearing bolt or bearing pin.

The spindle drive unit 400 is mounted rotatably on an outer base side 316. For example, the spindle drive unit 400 can be mounted rotatably on the outer base side 316 via a bearing element 410, for example in the form of a bearing bolt or bearing pin.

The seat frame 320 comprises two lateral frame parts 322, for example lateral seat frame parts. Furthermore, the seat frame 320 can comprise a front frame part 324, for example a front seat frame part. The lateral frame parts 322 are connected to one another via the optional front frame part 324. The optional front frame part 324 can alternatively also be designed as a transverse bar or a transverse tube. Furthermore, the seat frame 320 comprises a rear transverse crosspiece 326, for example a transverse bar or a transverse tube. The transverse crosspiece 326 connects the lateral frame parts 322.

The seat frame 320 is connected to the base frame 310 via the rocker arrangement 210.

Figure 3:
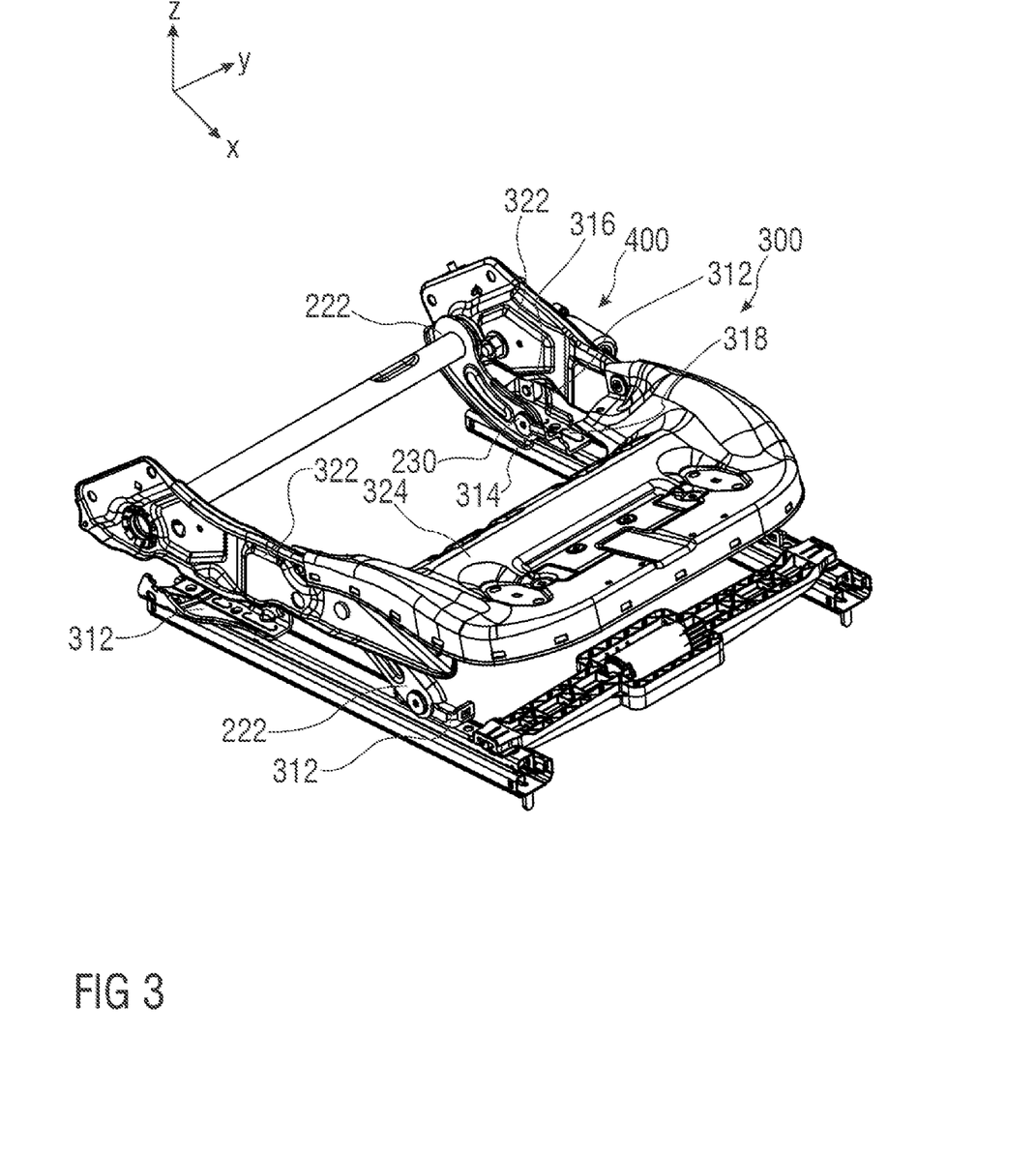
FIG. 3: shows a further perspective view of the height adjuster according to the invention according to FIG. 2, FIG. 4: shows a side view of the height adjuster according to the invention according to FIG. 2, FIG. 5: shows a section along the line I-I in FIG. 4 of the height adjuster according to the invention.

FIG. 3 shows a further perspective view of the height adjuster 200 according to the invention according to FIG. 2.

The rocker arrangement 210 comprises two pairs or rockers 220, in particular a front pair of rockers 220 and a rear pair of rockers 220. The pairs or rockers 220 each comprise two rockers 222. Each rocker 222, for example in the form of a lever arm, is connected to a base element 312. Each rocker 222 is mounted rotatably on a base element 312.

The rear pair of rockers 220, alternatively or optionally additionally also the second pair of rockers 220, can be arranged offset in the transverse direction y with respect to the spindle drive unit 400. The spindle drive unit 400 is accordingly located in the region of the rear pair of rockers 220.

The underframe 300 has a spring element 330 for pretensioning the seat frame 320 into a starting position. The spring element 330 can be formed by a torsion bar spring which is clamped in a manner substantially free from play in a connecting region of the transverse crossbar 326 on the frame part 322.

The rear pair of rockers 220 is connected at one end to the transverse crossbar 326 and at the other end to the base frame 310.

Figure 4:
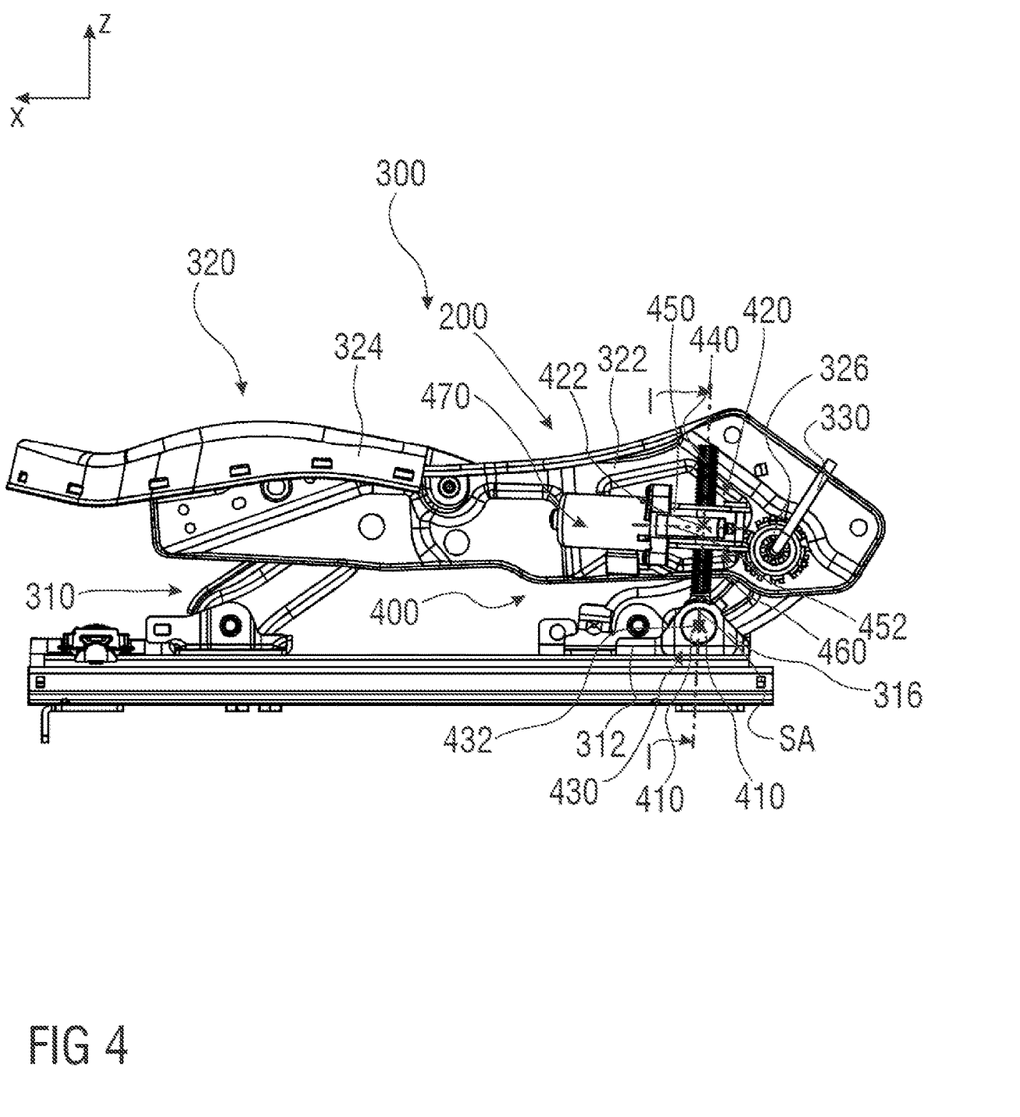

FIG. 4 shows a side view of the height adjuster 200 according to the invention according to FIG. 2.

The underframe 300 comprises the base frame 310 which is connectable to a vehicle floor and the seat frame 320 which is adjustable relative to the base frame 310 and has two lateral frame parts 322 and optionally a front frame part 324, for example connecting the lateral frame parts 322. Furthermore, the underframe 300 comprises the spindle drive unit 400 for adjusting the seat frame 320 relative to the base frame 310, wherein the spindle drive unit 400 has a first bearing point 420, which is connected pivotably to the lateral frame part 322, and a second bearing point 430, which is connected pivotably to the base frame 310, in particular to a base element 312 of the base frame 310. Each of the bearing points 420, 430 defines a pivot axis 422, 432 which is illustrated in more detail in FIG. 5 and about which the spindle drive unit 400 is pivotable or rotatable.

The underframe 300 can have a four bar linkage mechanism which is actuable with the aid of the spindle drive mechanism according to the invention.

A characteristic feature of the underframe 300 is that the spindle drive unit 400 can be arranged completely on and/or along, i.e. that very substantially all of the components of the spindle drive unit 400 can be arranged on and/or along, a side surface of the frame part 322 of the seat frame 320. In order to receive the spindle drive unit 400, the frame part 322 comprises a corresponding receiving structure for receiving the spindle drive unit 400. The receiving structure can be designed in the form of a recess, inward curvature or outward curvature or bulge directed away from the spindle drive unit 400. In the region of the spindle drive unit 400, the frame part 322 can be deformed, bent or punched, for example inward, away from the spindle drive unit 400. The side surface of the frame part 322 can run flat in sections and can have the receiving structure in one section.

A characteristic feature of the spindle drive unit 400 is that the pivot axes 422, 432 of the bearing points 420, 430 are arranged spaced apart from one another and run parallel to one another. The pivot axes 422, 432 run parallel to a transverse axis. The spindle drive unit 400 can be mounted rotatably about the pivot axes 422, 432 relative to the seat frame 320 and to the base frame 310. This permits a simple height adjustment of the seat, with ergonomic requirements of a person sitting on the seat being able to be met. In addition, a simple and compact four bar linkage mechanism can thereby be formed.

Figure 5:
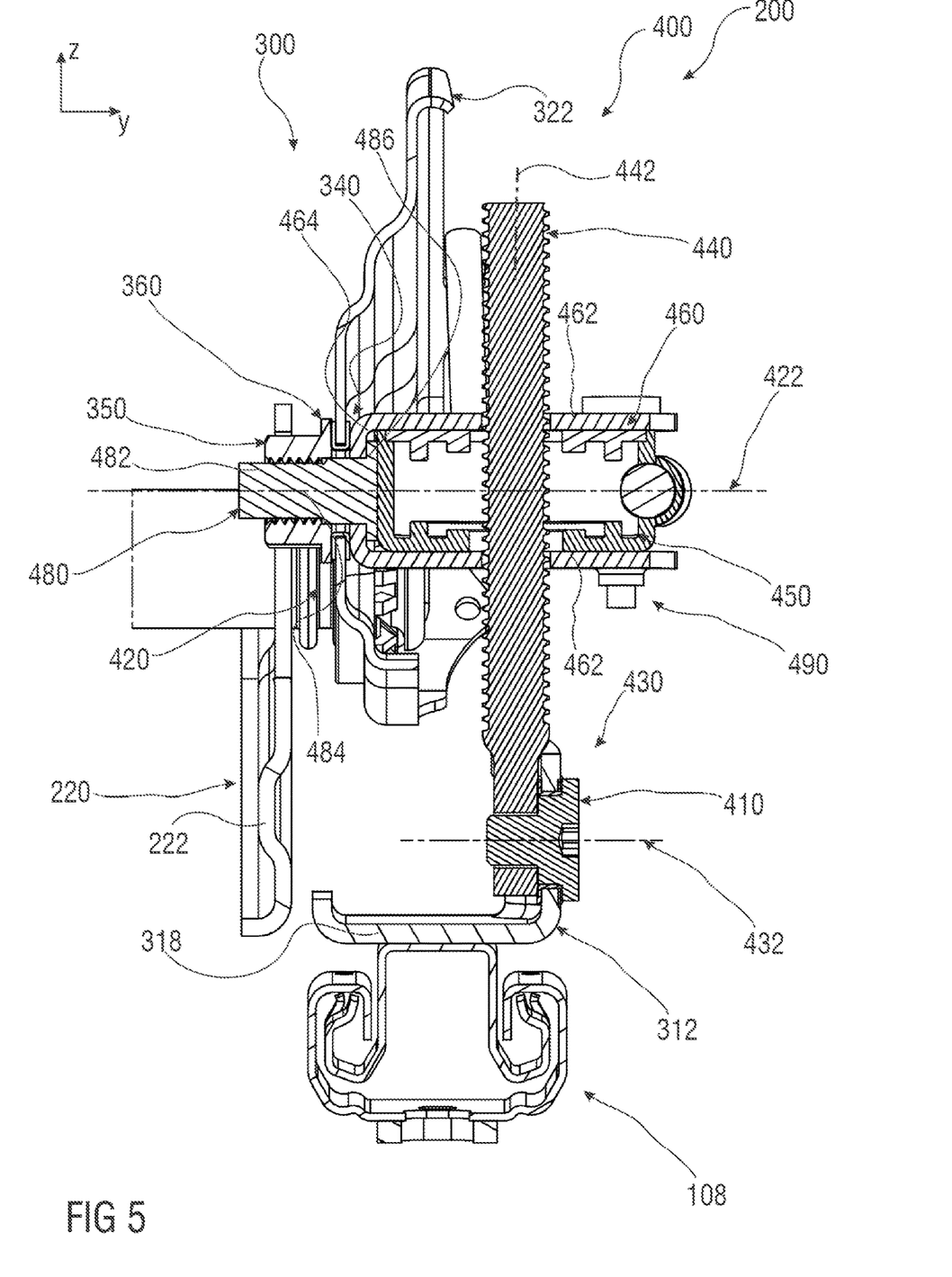

The spindle drive unit 400 comprises a spindle 440, wherein a spindle axis 442, illustrated in FIG. 5, of the spindle 440 is arranged perpendicularly to the pivot axes 422, 432 defined by the bearing points 420, 430. The spindle 440 can define an adjustment direction. A transmission unit 450 of the spindle drive unit 400 can be moved along the spindle axis 442, with pivoting of the spindle drive unit 400 about the respective pivot axis 422, 432 of the bearing points 420, 430 being brought about. The seat frame 320 is adjusted here relative to the base frame 310. The spindle axis 442 runs parallel to a vertical axis with regard to the illustrated starting position.

The spindle drive unit 400 accordingly comprises a transmission unit 450 for driving the spindle 440 and a holder 460 for receiving the transmission unit 450. The spindle drive unit 400 furthermore comprises a motor 470 which is coupled to the transmission unit 450 and extends parallel to the side surface of the frame part 322. Construction space can thereby be saved.

The transmission unit 450 can drive the spindle 440 perpendicularly to a transmission axis 452 of the transmission unit 450. The transmission axis 452 runs parallel to a longitudinal axis with regard to the illustrated starting position.

FIG. 5 shows a section along the line I-I in FIG. 4 of the height adjuster 200 according to the invention.

The pivot axes 422, 432 of the bearing points 420, 430 can be arranged spaced apart from one another and can run parallel to one another. The spindle drive unit 400 can be mounted rotatably about the pivot axes 422, 432 relative to the seat frame 320 and to the base frame 310.

The holder 460 has the first bearing point 420. One end of the spindle 440 forms the second bearing point 430. The bearing points 420, 430 each comprise a bearing element 410, 480 which is designed as a bolt. For example, the first bearing point 420 can comprise a bearing element 480 which is designed as a stepped bolt and which is arranged and mounted pivotably in a bearing opening 340 of the frame part 322.

A protruding first end 482 of the bearing element 480, in particular of the stepped bolt, can be fastened to the frame part 322 by a nut 350. The protruding end 482 of the stepped bolt can have an external thread and the nut 350 an internal thread. A bearing bushing 360 can be arranged in the bearing opening 340. The bearing element 480 which is designed as a stepped bolt is held in a form-fitting and rotatable manner in the bearing opening 340 by the bearing bushing 360. The bearing element 480 has a flange portion 486 at a second end 484 opposite the protruding end 482. The second end 484 is connected to the holder 460. In particular, the second end 484 is guided through a receiving opening formed in the holder 460, with the flange portion 486 being supported on an inner side of the holder 460. For example, the flange portion 486 can be connected inside the holder 460 to the transmission unit 450, for example in an integrally bonded, force-fitting and/or form-fitting manner.

The end of the spindle 440 is mounted rotatably on the base frame 310, in particular on the U-shaped base element 312, via the associated bearing element 410. The bearing element 410 is held rotatably in a receiving opening in the base element 312.

The holder 460 is substantially U-shaped or C-shaped, with the transmission unit 450 being received between two limbs 462 of the holder 460. The bearing element 480 which is connected to the frame part 322 comprises a web 464 connecting the limbs 462. The spindle 440 runs perpendicularly to the limbs 462, wherein each of the limbs 462 has an associated opening for the passage of the spindle 440. Alternatively, the holder 460 can be L-shaped, for example. For example, the holder 460 can have a first holding side connected to the frame part 322 and a holding side connected to the transmission unit 450.

The transmission unit 450 is fixed to the holder 460 by a connecting element 490. The connecting element 490 can be a screw element, a rivet element, a bolt element or a pin element. The connecting element 490 is fastened to the limbs 462 of the holder 460.

Figure 6:
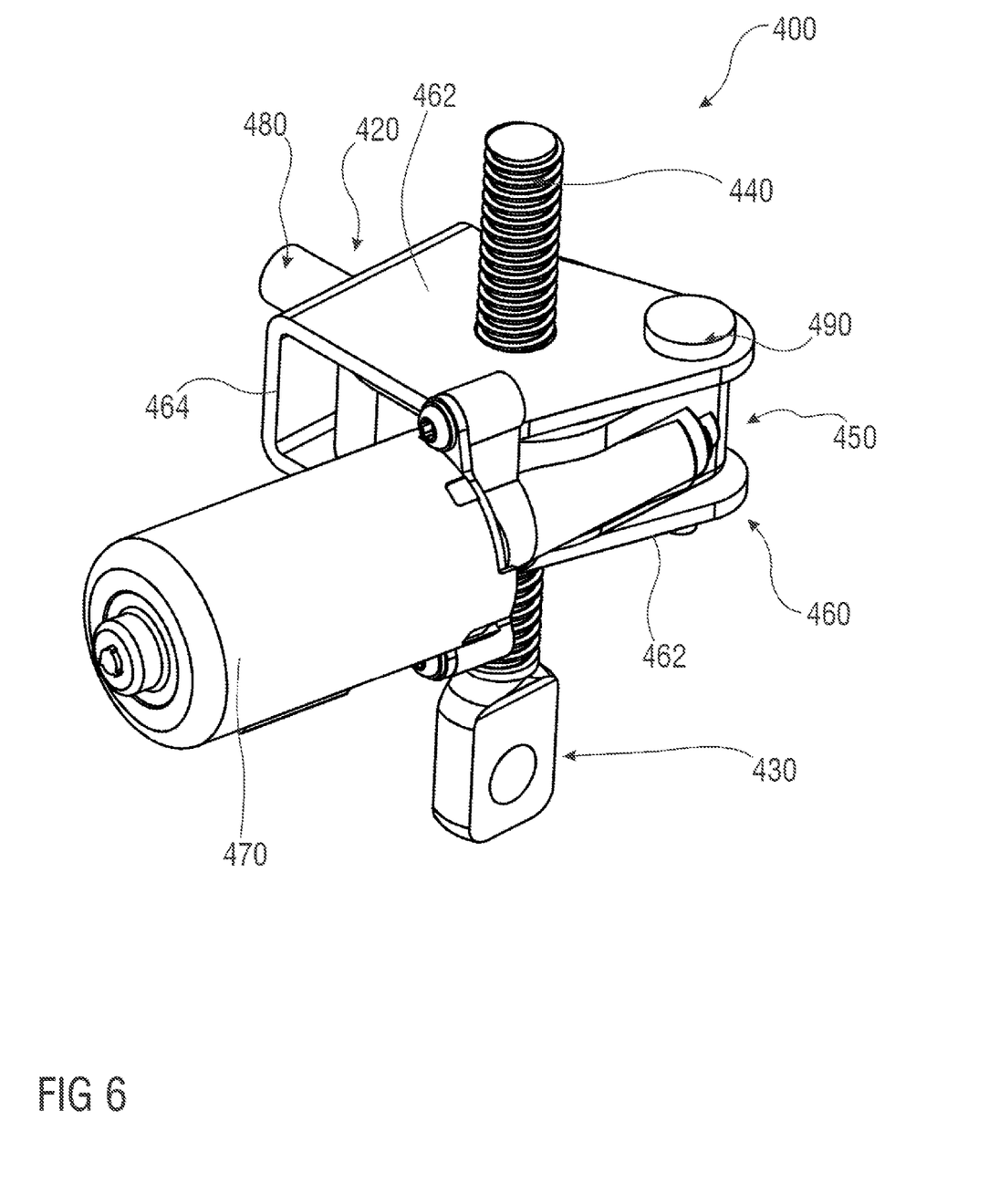
FIG. 6: shows a perspective view of a spindle drive unit of the height adjuster according to the invention according to FIG. 2, and FIG. 7: shows a further perspective view of the spindle drive unit according to FIG. 6.
Figure 7:
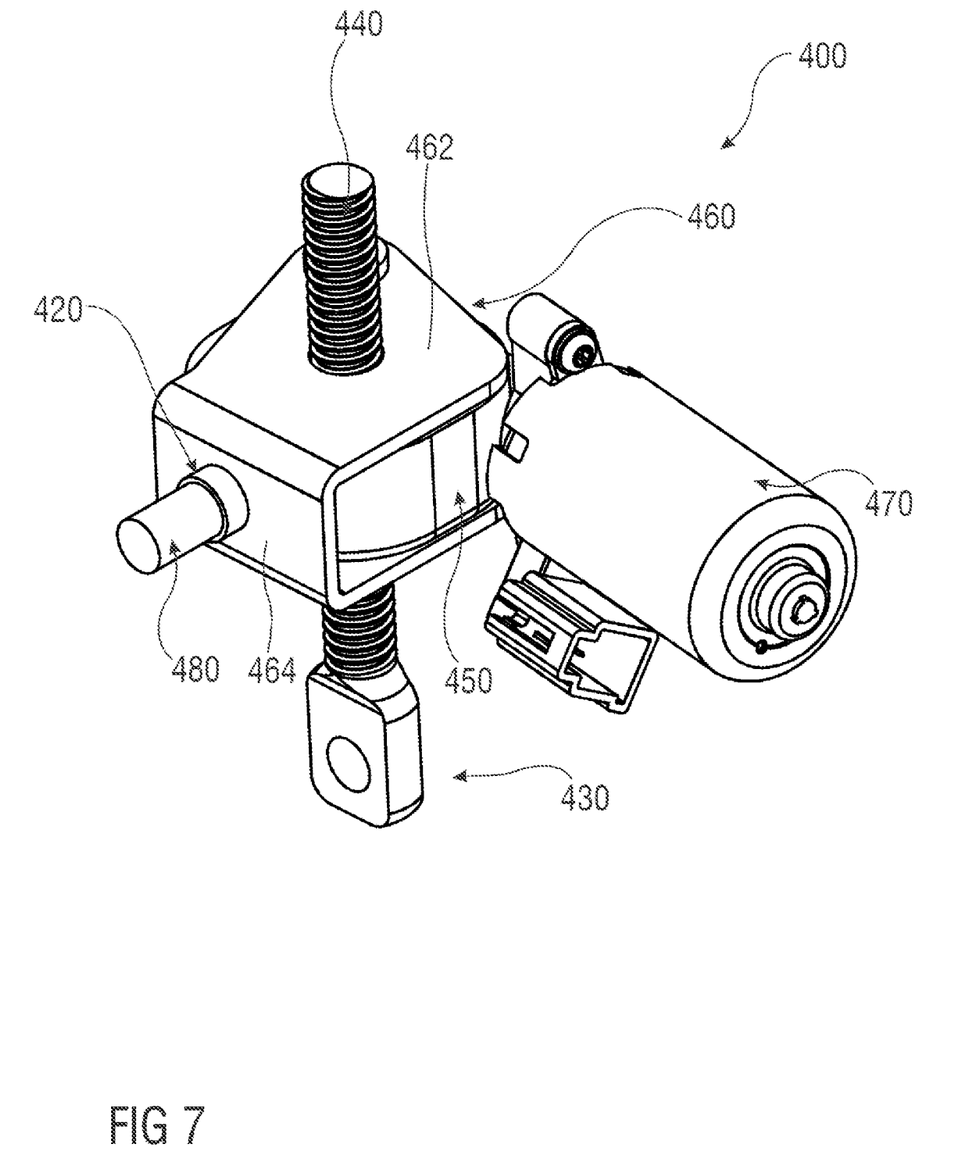

FIG. 6 shows a perspective view of a spindle drive unit 400 of the height adjuster 200 according to the invention according to FIG. 2, and FIG. 7 shows a further perspective view of the spindle drive unit 400 according to FIG. 6.

The spindle drive unit 400 is mounted directly on the seat frame 320, for example on a seat cushion frame, by a bearing element 480, in particular a stepped bolt, a bearing bushing 360 and a nut 350.

One end of the spindle 440 is coupled by a further bearing element 410 to the base frame 310, for example in the form of a rail holder or a vehicle floor holder. The spindle drive unit 400 has a transmission unit 450 which is driven by a motor 470 which is accommodated in a holder 460, for example in the form of a C bow or a U bow.

The transmission unit 450 is fixed to the holder 460 by a connecting element 490. The transmission unit 450 drives the spindle 440 up and down perpendicularly to the transmission axis 452.

The bearing element 480 can be welded to the holder 460 and can serve as a rotation point for the spindle drive unit 400 while it is being actuated in an upward direction and downward direction.

The spindle drive unit 400 is mounted directly on the seat frame with just two bearing points, as a result of which the number of components, the complexity and the costs are reduced.

Since the motor 470 for the transmission unit 450 is mounted from the outside along the frame part 322, for example along a longitudinal member of a seat frame, a minimal number of components have to be accommodated inside the seat frame.

The features disclosed in the above description, the claims and the figures may be of significance both individually and in combination for implementing the invention in its various configurations to the extent that they remain within the scope of protection of the claims.

LIST OF REFERENCE SIGNS

101 Vehicle seat
103 Seat part
105 Backrest
106 Pair of rails
108 Pair of rails
110 Seat rail
112 Floor rail
114 Electric motor
116 Adjustment transmission
120 Motor carrier
200 Height adjuster
210 Rocker arrangement
220 Pair of rockers
222 Rocker
230 Bearing element
300 Underframe
310 Base frame
312 Base element
314, 316 Base side
318 Base web
320 Seat frame 322 Frame part
324 Frame part
326 Transverse crosspiece
330 Spring element
340 Bearing opening
350 Nut
360 Bearing bushing
400 Spindle drive unit
410 Bearing element
420 Bearing point
422 Pivot axis
430 Bearing point
432 Pivot axis
440 Spindle
442 Spindle axis
450 Transmission unit
452 Transmission axis
460 Holder
462 Limb
464 Web
470 Motor
480 Bearing element
482 End
484 End
486 Flange portion
490 Connection element
x Longitudinal direction
y Transverse direction
z Vertical direction

The invention claimed is:

1. An underframe for a height adjuster of a vehicle seat, comprising:
   a base frame which is connectable to a vehicle floor,
   a seat frame which is adjustable relative to the base frame and has at least one frame part, and
   a spindle drive unit for adjusting the seat frame relative to the base frame, wherein the spindle drive unit has a first bearing point, which is connected pivotably to the frame part, and a second bearing point, which is connected pivotably to the base frame.

2. The underframe as claimed in claim 1, wherein pivot axes of the bearing points are arranged spaced apart from one another and run parallel to one another.

3. The underframe as claimed in claim 1, wherein the spindle drive unit comprises at least one spindle, wherein a spindle axis of the spindle is arranged oriented in a manner corresponding to pivot axes defined by the bearing points.

4. The underframe as claimed in claim 1, wherein the spindle drive unit is arranged on and/or along a side surface of the frame part.

5. The underframe as claimed in claim 4, wherein the spindle drive unit is arranged on one side of the frame part.

6. The underframe as claimed in claim 1, wherein the spindle drive unit comprises at least one transmission unit for driving the spindle and a holder for receiving the transmission unit.

7. The underframe as claimed in claim 6 wherein the spindle, the motor, the transmission unit and the holder are arranged on the same side of the frame part.

8. The underframe as claimed in claim 6, wherein the holder forms the first bearing point and one end of the spindle forms the second bearing point, wherein the bearing points each have a bearing element.

9. The underframe as claimed in claim 6, wherein the holder comprises at least one web connected to the frame part and a limb protruding perpendicularly from said web, wherein the transmission unit is fastened to the limb.

10. The underframe as claimed in claim 6, wherein the spindle drive unit comprises a motor which is coupled to the transmission unit and extends parallel to the side surface of the frame part.

11. The underframe as claimed in claim 6 wherein the transmission unit drives the spindle perpendicularly to the transmission axis of the transmission unit.

12. A height adjuster for vehicle seat, having an underframe as claimed in claim 1 and a rocker arrangement, wherein a spindle drive unit of the underframe is arranged in the region of a pair of rockers of the rocker arrangement.

* * * * *